US008001193B2

(12) United States Patent
Sugiyama et al.

(10) Patent No.: US 8,001,193 B2
(45) Date of Patent: Aug. 16, 2011

(54) DATA COMMUNICATIONS SYSTEM AND DATA COMMUNICATIONS METHOD FOR DETECTING UNSOLICITED COMMUNICATIONS

(75) Inventors: Takeshi Sugiyama, Yokosuka (JP); Masaru Takahashi, Yokohama (JP); Masashi Yamashita, Yokosuka (JP); Kazuo Sugiyama, Yokohama (JP); Youji Oosako, Yokosuka (JP); Manhee Jo, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 648 days.

(21) Appl. No.: 11/434,213

(22) Filed: May 16, 2006

(65) Prior Publication Data

US 2006/0262867 A1 Nov. 23, 2006

(30) Foreign Application Priority Data

May 17, 2005 (JP) ................ P2005-144651

(51) Int. Cl.
*G06F 15/16* (2006.01)
(52) U.S. Cl. .............. 709/206; 709/232; 709/224
(58) Field of Classification Search .............. None
See application file for complete search history.

(56) References Cited

U.S. PATENT DOCUMENTS

| | | | | |
|---|---|---|---|---|
| 4,469,919 A * | 9/1984 | Nakamura et al. | ............. | 379/73 |
| 6,023,723 A * | 2/2000 | McCormick et al. | ......... | 709/206 |
| 6,052,709 A * | 4/2000 | Paul | .............. | 709/202 |
| 6,314,477 B1 * | 11/2001 | Cowger et al. | ............... | 710/22 |
| 6,324,570 B1 * | 11/2001 | Tonchev et al. | ............... | 709/207 |
| 6,421,709 B1 * | 7/2002 | McCormick et al. | ......... | 709/206 |
| 6,654,787 B1 * | 11/2003 | Aronson et al. | .............. | 709/206 |
| 6,941,348 B2 * | 9/2005 | Petry et al. | ................... | 709/206 |
| 7,092,992 B1 * | 8/2006 | Yu | ................... | 709/206 |
| 7,155,539 B2 * | 12/2006 | Vange et al. | .................. | 709/250 |
| 7,197,618 B2 * | 3/2007 | M'Zoughi et al. | ............ | 711/170 |
| 7,219,148 B2 * | 5/2007 | Rounthwaite et al. | ........ | 709/224 |
| 7,222,157 B1 * | 5/2007 | Sutton et al. | .................. | 709/206 |
| 7,251,217 B2 * | 7/2007 | Wong et al. | ................... | 370/232 |
| 7,272,378 B2 * | 9/2007 | Petry et al. | .................... | 455/403 |
| 7,272,853 B2 * | 9/2007 | Goodman et al. | .............. | 726/13 |
| 7,284,055 B1 * | 10/2007 | Oehrke et al. | ................ | 709/226 |
| 7,293,063 B1 * | 11/2007 | Sobel | ............................ | 709/206 |

(Continued)

FOREIGN PATENT DOCUMENTS

JP 2003-163696 6/2003

(Continued)

OTHER PUBLICATIONS

N.G. Duffield, et al., "Trajectory Sampling for Direct Traffic Observation", Proc. ACM SIGCOMM' 2000, Computer Communications Review, vol. 30, No. 4, Oct. 2000, pp. 1-14.

(Continued)

*Primary Examiner* — Ian N Moore
*Assistant Examiner* — Dung B Huynh
(74) *Attorney, Agent, or Firm* — Oblon, Spivak, McClelland, Maier & Neustadt, L.L.P.

(57) ABSTRACT

A data communications system which communicates data via a data communications network, includes: an information extraction unit configured to extract an extraction target from received data; a comparison information generator/transmitter unit configured to generate and transmit comparison information including the extraction target extracted by the information extraction unit; a comparison unit configured to compare the received comparison information with the received data; and a cancellation processor unit configured to delete the received data, when the received comparison information agrees with the received data.

2 Claims, 7 Drawing Sheets

U.S. PATENT DOCUMENTS

| | | | | |
|---|---|---|---|---|
| 7,299,261 | B1* | 11/2007 | Oliver et al. | 709/206 |
| 7,325,249 | B2* | 1/2008 | Sutton et al. | 726/13 |
| 7,373,385 | B2* | 5/2008 | Prakash | 709/206 |
| 7,380,126 | B2* | 5/2008 | Logan et al. | 713/176 |
| 7,395,349 | B1* | 7/2008 | Szabo et al. | 709/238 |
| 7,406,502 | B1* | 7/2008 | Oliver et al. | 709/206 |
| 7,447,642 | B2* | 11/2008 | Bodin | 705/1 |
| 7,464,264 | B2* | 12/2008 | Goodman et al. | 713/154 |
| 7,472,178 | B2* | 12/2008 | Lisiecki et al. | 709/223 |
| 7,493,366 | B1* | 2/2009 | Bowie et al. | 709/206 |
| 7,734,627 | B1* | 6/2010 | Tong | 707/737 |
| 2002/0038339 | A1* | 3/2002 | Xu | 709/203 |
| 2002/0116463 | A1* | 8/2002 | Hart | 709/206 |
| 2002/0129111 | A1* | 9/2002 | Cooper | 709/207 |
| 2003/0061350 | A1* | 3/2003 | Masuoka et al. | 709/225 |
| 2003/0126449 | A1* | 7/2003 | Kelly et al. | 713/187 |
| 2003/0140309 | A1* | 7/2003 | Saito et al. | 715/500 |
| 2003/0158905 | A1* | 8/2003 | Petry et al. | 709/206 |
| 2003/0172163 | A1* | 9/2003 | Fujita et al. | 709/226 |
| 2003/0191969 | A1* | 10/2003 | Katsikas | 713/201 |
| 2003/0200464 | A1* | 10/2003 | Kidron | 713/201 |
| 2003/0223447 | A1* | 12/2003 | Saxena et al. | 370/428 |
| 2004/0015605 | A1* | 1/2004 | Demetriades et al. | 709/238 |
| 2004/0068543 | A1* | 4/2004 | Seifert | 709/206 |
| 2004/0073617 | A1* | 4/2004 | Milliken et al. | 709/206 |
| 2004/0105118 | A1* | 6/2004 | El-Gazzar et al. | 358/1.15 |
| 2004/0117648 | A1* | 6/2004 | Kissel | 713/200 |
| 2004/0177110 | A1* | 9/2004 | Rounthwaite et al. | 709/202 |
| 2004/0181585 | A1* | 9/2004 | Atkinson et al. | 709/206 |
| 2004/0210640 | A1* | 10/2004 | Chadwick et al. | 709/207 |
| 2004/0260922 | A1* | 12/2004 | Goodman et al. | 713/154 |
| 2005/0005164 | A1* | 1/2005 | Syiek et al. | 713/201 |
| 2005/0015454 | A1* | 1/2005 | Goodman et al. | 709/207 |
| 2005/0015455 | A1* | 1/2005 | Liu | 709/207 |
| 2005/0022008 | A1* | 1/2005 | Goodman et al. | 713/201 |
| 2005/0050150 | A1* | 3/2005 | Dinkin | 709/207 |
| 2005/0060643 | A1* | 3/2005 | Glass et al. | 715/501.1 |
| 2005/0076084 | A1* | 4/2005 | Loughmiller et al. | 709/206 |
| 2005/0080856 | A1* | 4/2005 | Kirsch | 709/206 |
| 2005/0097174 | A1* | 5/2005 | Daniell | 709/206 |
| 2005/0108257 | A1* | 5/2005 | Ishii et al. | 707/100 |
| 2005/0132197 | A1* | 6/2005 | Medlar | 713/176 |
| 2005/0138109 | A1* | 6/2005 | Redlich et al. | 709/201 |
| 2005/0160148 | A1* | 7/2005 | Yu | 709/206 |
| 2005/0160292 | A1* | 7/2005 | Batthish et al. | 713/201 |
| 2005/0188028 | A1* | 8/2005 | Brown et al. | 709/206 |
| 2005/0188032 | A1* | 8/2005 | Yamazaki et al. | 709/206 |
| 2005/0188036 | A1* | 8/2005 | Yasuda | 709/206 |
| 2005/0198159 | A1* | 9/2005 | Kirsch | 709/206 |
| 2005/0198289 | A1* | 9/2005 | Prakash | 709/225 |
| 2005/0204159 | A1* | 9/2005 | Davis et al. | 713/201 |
| 2005/0210106 | A1* | 9/2005 | Cunningham | 709/206 |
| 2005/0216587 | A1* | 9/2005 | John | 709/225 |
| 2005/0246420 | A1* | 11/2005 | Little | 709/204 |
| 2005/0251861 | A1* | 11/2005 | Cunningham et al. | 726/23 |
| 2006/0010209 | A1* | 1/2006 | Hodgson | 709/206 |
| 2006/0015561 | A1* | 1/2006 | Murphy et al. | 709/206 |
| 2006/0031306 | A1* | 2/2006 | Haverkos | 709/206 |
| 2006/0031307 | A1* | 2/2006 | Bhatia | 709/206 |
| 2006/0047768 | A1* | 3/2006 | Gellens | 709/207 |
| 2006/0047769 | A1* | 3/2006 | Davis et al. | 709/207 |
| 2006/0053293 | A1* | 3/2006 | Zager et al. | 713/176 |
| 2006/0075030 | A1* | 4/2006 | van Riel | 709/206 |
| 2006/0095586 | A1* | 5/2006 | Adelman et al. | 709/245 |
| 2006/0095966 | A1* | 5/2006 | Park | 726/22 |
| 2006/0123083 | A1* | 6/2006 | Goutte et al. | 709/206 |
| 2006/0149821 | A1* | 7/2006 | Rajan et al. | 709/206 |
| 2006/0168041 | A1* | 7/2006 | Mishra et al. | 709/206 |
| 2006/0212572 | A1* | 9/2006 | Afek et al. | 709/206 |
| 2006/0242244 | A1* | 10/2006 | Logue et al. | 709/206 |
| 2007/0294765 | A1* | 12/2007 | Rihn et al. | 726/22 |
| 2008/0005782 | A1* | 1/2008 | Aziz | 726/3 |
| 2008/0294726 | A1* | 11/2008 | Sidman | 709/206 |

FOREIGN PATENT DOCUMENTS

| | | |
|---|---|---|
| JP | 2003-249964 | 9/2003 |
| JP | 2004-178541 | 6/2004 |
| JP | 2004-348523 | 12/2004 |

OTHER PUBLICATIONS

Alex C. Snoeren, et al., "Single-Packet IP Traceback", IEEE/ACM Transactions on Networking, vol. 10, No. 6, Dec. 2002, pp. 721-734.

"Distributed Checksum Clearinghouse", http://www.rhyolite.com/anti-spam/dcc/, 4 pages.

Kenichi Yoshida, et al., "Density-Based Spam Detector", IEICE Trans. Inf. & Syst., vol. E87-D, No. 12, Dec. 2004, pp. 2678-2688.

Yohsuke Takei, et al., "Detecting and Tracing Illegal Access by Using Traffic Pattern Matching Technique", Electronics and Communications in Japan, Part 1, vol. J84-B, No. 8, Aug. 2001, pp. 1464-1473 (with English Translation).

* cited by examiner

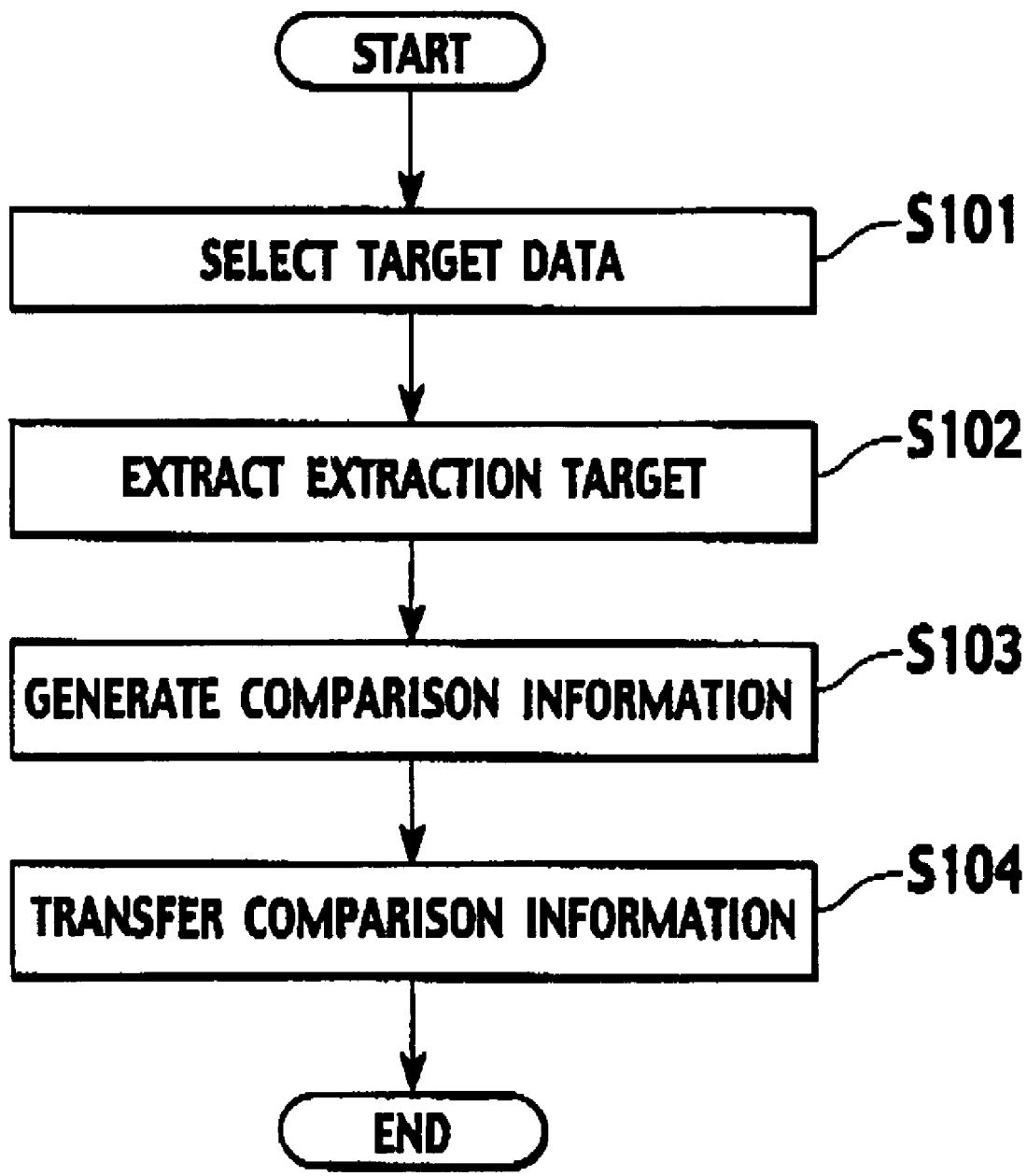

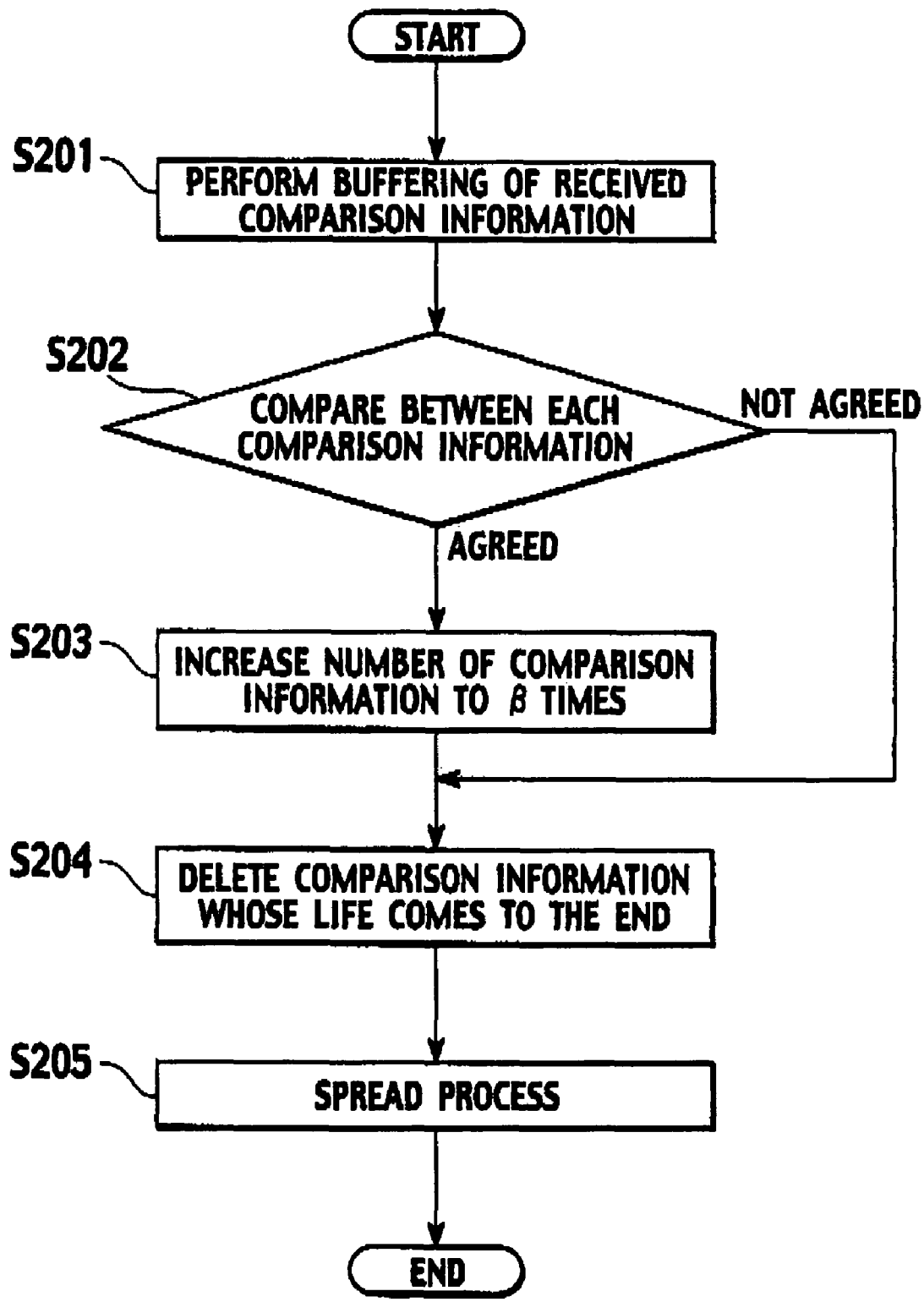

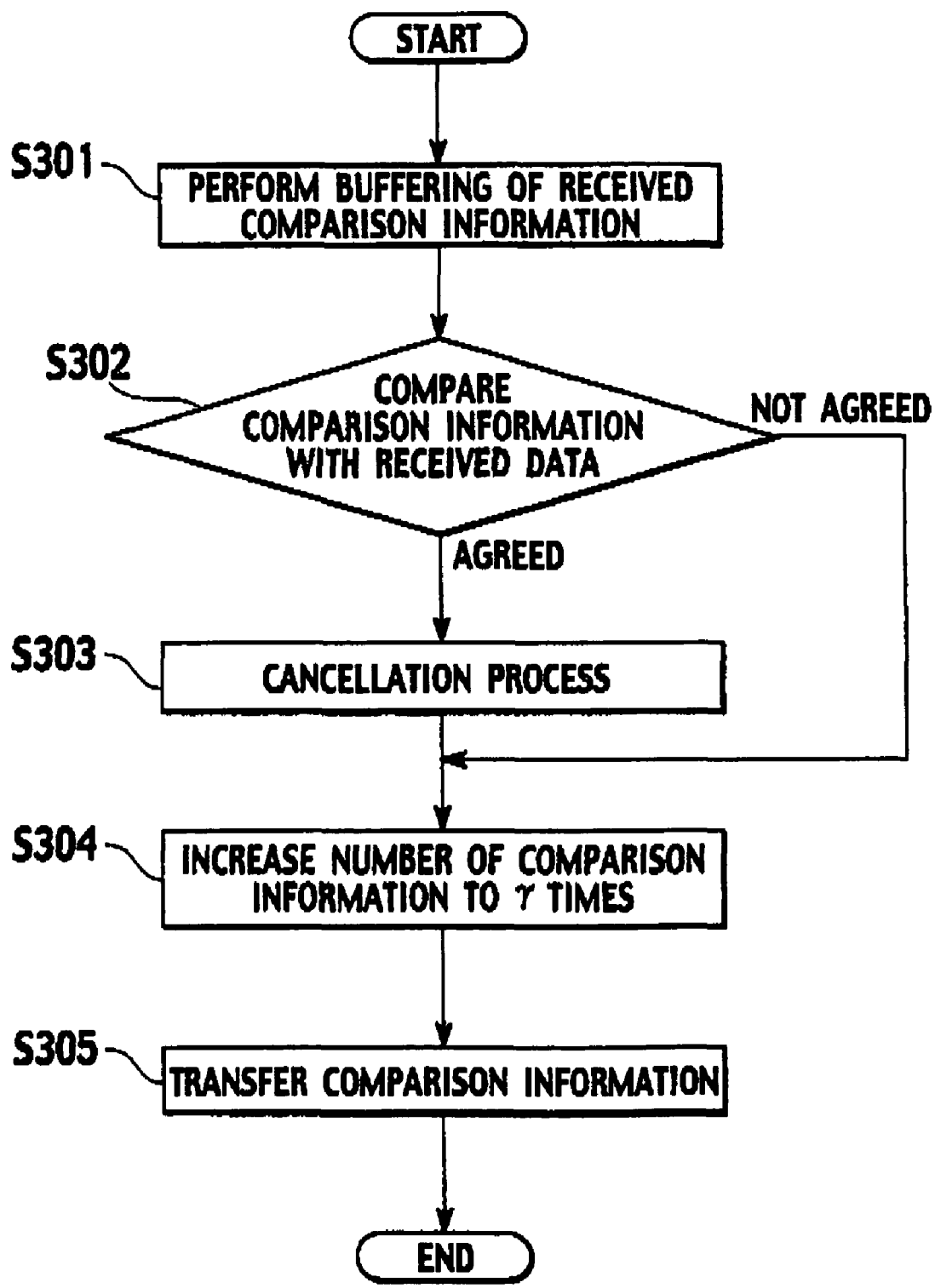

(1)

DATA COMMUNICATIONS SYSTEM AND DATA COMMUNICATIONS METHOD FOR DETECTING UNSOLICITED COMMUNICATIONS

CROSS REFERENCE TO RELATED APPLICATION

This application is based upon and claims the benefit of priority from the prior Japanese Patent Application No. P2005-144651, filed on May 17, 2005; the entire contents of which are incorporated herein by reference.

BACKGROUND OF THE INVENTION

1. Field of the Invention

The present invention relates to a data communications system and a data communications method, in which data is communicated via a data communications network.

2. Description of the Related Art

Conventionally known is a technique to control a traffic amount in a data communications network by causing a transfer device, which configures a data communications system, to measure the number or amount of data (for example, the number or amount of packets) passing through the transfer device within a certain period of time.

Recently, a technique similar to the above-mentioned one that controls the traffic amount is used as a countermeasure against unsolicited communications such as e-mails and worms.

For example, as shown in Japanese Patent Application Laid-open No. 2004-178541, known is a technique in which a large amount of e-mail transmission (unsolicited communications) is detected to inhibit an information transfer action, by causing an information delivery device (a transfer device) to perform filtering depending on the amount of received information (for example, the number of e-mails and the like).

Furthermore, as shown in "Unauthorized Access Detection and Tracking Method by Use of Traffic Pattern" pp. 1464-1473, the Japanese Journal of the Institute of Electronics, Information and Communication Engineers, vol. J84-B, No. 8, August, 2001, the following technique is known: when the number of packets abnormally increased is detected at a plurality of points in a data communications network, it is judged as a distributed denial of service (DDoS) attack, then identifying the network where the attack was originated by investigating the points retrospectively, and inhibiting the information transfer action.

Moreover, known is a technique which uses information for judgment called "signature", which is created off line by general antivirus software, a firewall function and the like, to detect the unsolicited communications.

This technique needs to cause antivirus software and a firewall function to distribute the "signature" to each client, or needs to cause each client to download the "signature".

However, the unsolicited communications detectable by the above "signature" is limited to already-known unsolicited communications.

In addition, as shown in "Basic of Mobile Communications", Corona Publishing Co., Ltd., 1986, mobile communications (that is, communications in a form where a data communications device moves) need to select specific points (for example, an anchor node, a gateway, an edge node and the like) and to observe and administer each communication at the specific points.

(2)

It is also required that filtering control should be performed on the unsolicited communications by bringing in the "signature" and the like to the specific points.

Here, also conceived is to move the specific points. However, moving the specific points while holding the observation result is recognized to be a difficult technique.

Moreover, known is a technique in which a filter is created by widely gathering information from users in order to judge whether the communications are unsolicited or not.

Furthermore, when a number of users actually read received e-mails and judge them to be unsolicited communications with their own wills and behavior, in the technique, the above filter is configured to be changed by notifying predetermined devices of the fact to that effect.

However, the following problems are not solved by use of the conventional techniques with the countermeasures against unsolicited communications (bulk communications).

A first problem is the difficulty in processing on a suspected communication which appears for the first time (a communication suspected as an unsolicited communication), in real time.

The first problem is attributed to the facts that "the 'signature' used to detect a unsolicited communication such as a virus or a worm is created by analyzing the behavior of past unsolicited communications in a backyard" and that "a long period of time is required to collect notices related to the unsolicited communications (for example, unsolicited e-mails and the like) from users in a wide area, as in a case of a Web-mail service".

A second problem is that it is actually difficult, in the mobile communication, to select specific points where the above filtering control is performed.

Generally, a judgment process (signature matching) by use of the above "signature" and behavior analyses on past unsolicited communications are performed by observing and administrating individual communications at the above specific points.

However, considering a situation in which there are: an increase in the traffic amount to be handled; a fragmentation of each data (an increase in the number of data of a small amount or data with a short holding time); an existence of a communications format such as the format of P2P; an existence of a communications format where a communications path in a data communications network is dynamically changed with a move of a data communications device; and the like, it is difficult to realize the above countermeasures against the unsolicited communications simply by performing an information process (a filtering control) in a fixed location on the communications path (that is, the specific point).

A third problem is that it is not possible to handle an unsolicited communication which becomes a large amount of data as a result of combining the data of a small amount, which are dispersedly generated from a wide area.

The third problem is attributed to the necessity of a certain number of suspected communications existing locally, in order to improve the sensitivity of detecting unsolicited communications.

A fourth problem is that the types of "signature (information for judgment)" used as a basis for judging a communication to be an unsolicited communication is limited, and that the judgment precision for unsolicited communications does not improve.

The amount of processing related to the extraction and distribution of "signature" in data transmitted via a suspected communication, and the amount of information to be collected for observing the behavior of past unsolicited communications, are enormous.

However, when real time processing on suspected communications is necessary, the above judgment should be made by use of information from a limited area, such as a communication (for example, an e-mail and the like) addressed to a specific user, and a communication (for example, an e-mail addressed to a user stored in the relevant mail server) reaching a specific device (for example, a gateway device such as a mail server, and the like). As a result, the precision for judging unsolicited communications does not improve.

BRIEF SUMMARY OF THE INVENTION

The present invention has been made considering the problems, and its object is to provide a data communications system and a data communications method, which can solve problems in conventional processing on unsolicited communications.

A first aspect of the present invention is summarized as a data communications system which communicates data via a data communications network, including: an information extraction unit configured to extract an extraction target from received data; an comparison information generator/transmitter unit configured to generate and transmit comparison information including the extraction target extracted by the information extraction unit; a comparison unit configured to compare the received comparison information with the received data; and a cancellation processor unit configured to delete the received data, when the received comparison information agrees with the received data.

In the first aspect, the comparison unit can be further configured to compare the received comparison information with each other; and the data communications system can further include an amplification/spread processor unit configured to increase the number of the comparison information and to transfer the comparison information, when the received comparison information agree with each other.

In the first aspect, the amplification/spread processor unit can be configured to perform a predetermined weight assignment process regarding the number of the comparison information to be transferred to each transfer destination.

In the first aspect, the amplification/spread processor unit can be configured to perform the weight assignment process based on a topology of a neighboring function.

In the first aspect, the amplification/spread processor unit can be configured to perform the weight assignment process depending upon the number of the received comparison information.

In the first aspect, the amplification/spread processor unit can be configured to perform the weight assignment process depending upon the number of the transferred comparison information.

In the first aspect, the comparison unit can be configured to compare the comparison information with the data, when receiving the same type of comparison information the number of which is equal to or more than a threshold value.

In the first aspect, the cancellation processor unit can be configured to increase the number of the comparison information, when the received comparison information agrees with the received data.

In the first aspect, the comparison information can be composed of a part of the received data.

In the first aspect, the comparison information can be configured to include a specific word included in the received data and an appearance order of the specific word.

In the first aspect, the data communications system can further includes a life manager unit configured to delete the comparison information which has passed a certain period of time after the comparison information is generated.

In the first aspect, the comparison unit can be configured to select comparison information which is used for comparison, depending upon a place where the comparison information is generated.

A second aspect of the present invention is summarized as a data communications method for communicating data via a data communications network, including: extracting an extraction target from received data; generating comparison information which includes the extraction target extracted, and transmitting the generated comparison information; comparing received comparison information with received data; and deleting the data when the received comparison information agrees with the received data.

In the second aspect, the data communications method can further include: comparing the received information with each other; and increasing the number of the comparison information, and transferring the comparison information, when the received comparison information agree with each other.

In the second aspect, the data communications method can further include: performing a predetermined weight assignment process for the number of the comparison information to be transferred to each transfer destination.

BRIEF DESCRIPTION OF THE SEVERAL VIEWS OF THE DRAWINGS

FIG. 4 is a flow chart showing operations of generating and transferring comparison information in the communications system according to the first embodiment of the present invention.

FIG. 6 is a flow chart showing operations of amplification and spread processes in the communications-system according to the first embodiment of the present invention.

FIG. 7 is a flow chart showing operation of a cancellation process in the communications system of the first embodiment of the present invention.

DETAILED DESCRIPTION OF THE INVENTION (Configuration of Data Communications System According to a First Embodiment of Present Invention)

Figure 1:
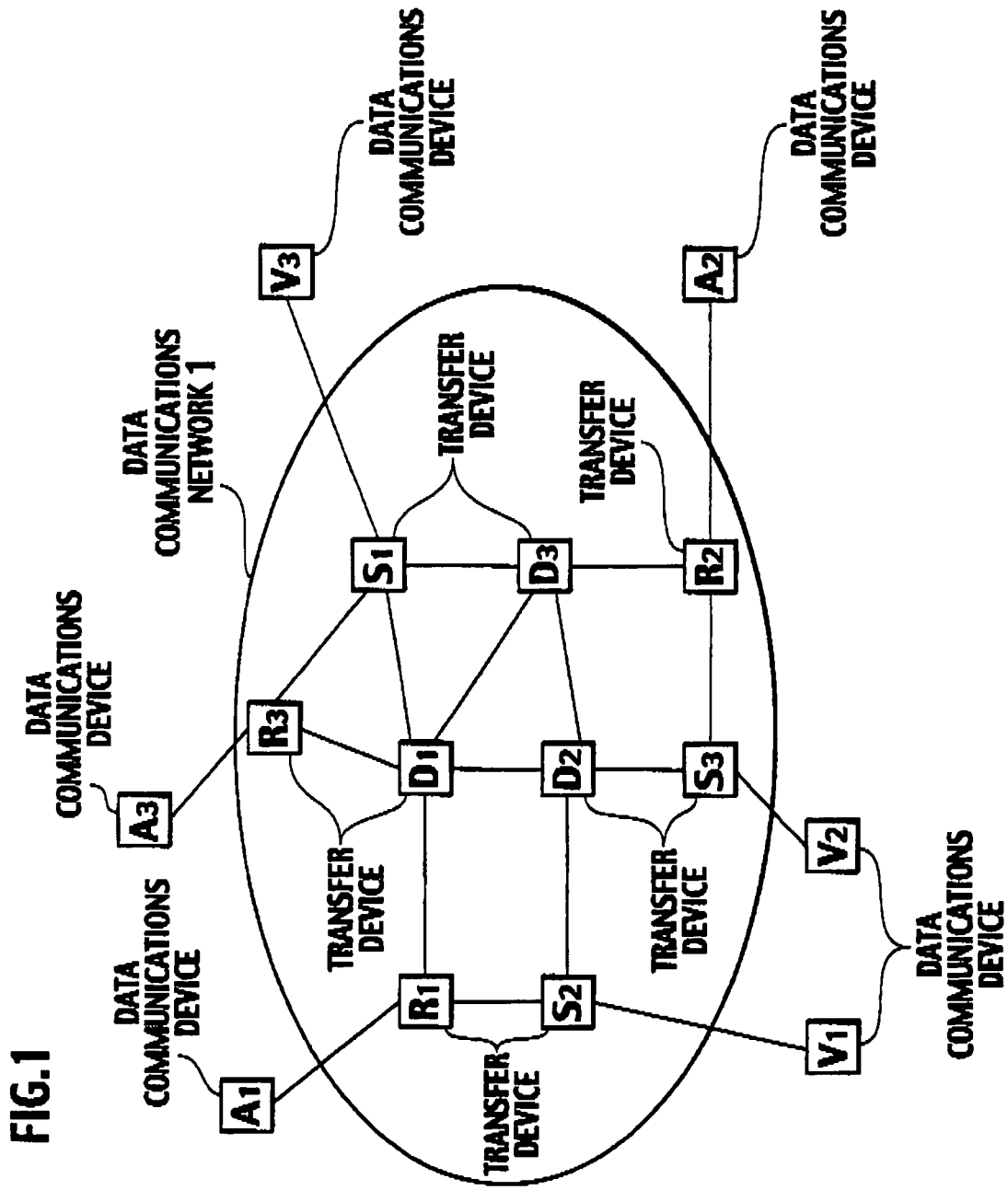
FIG. 1 is a whole configuration diagram of a communications system according to a first embodiment of the present invention.
Figure 2:
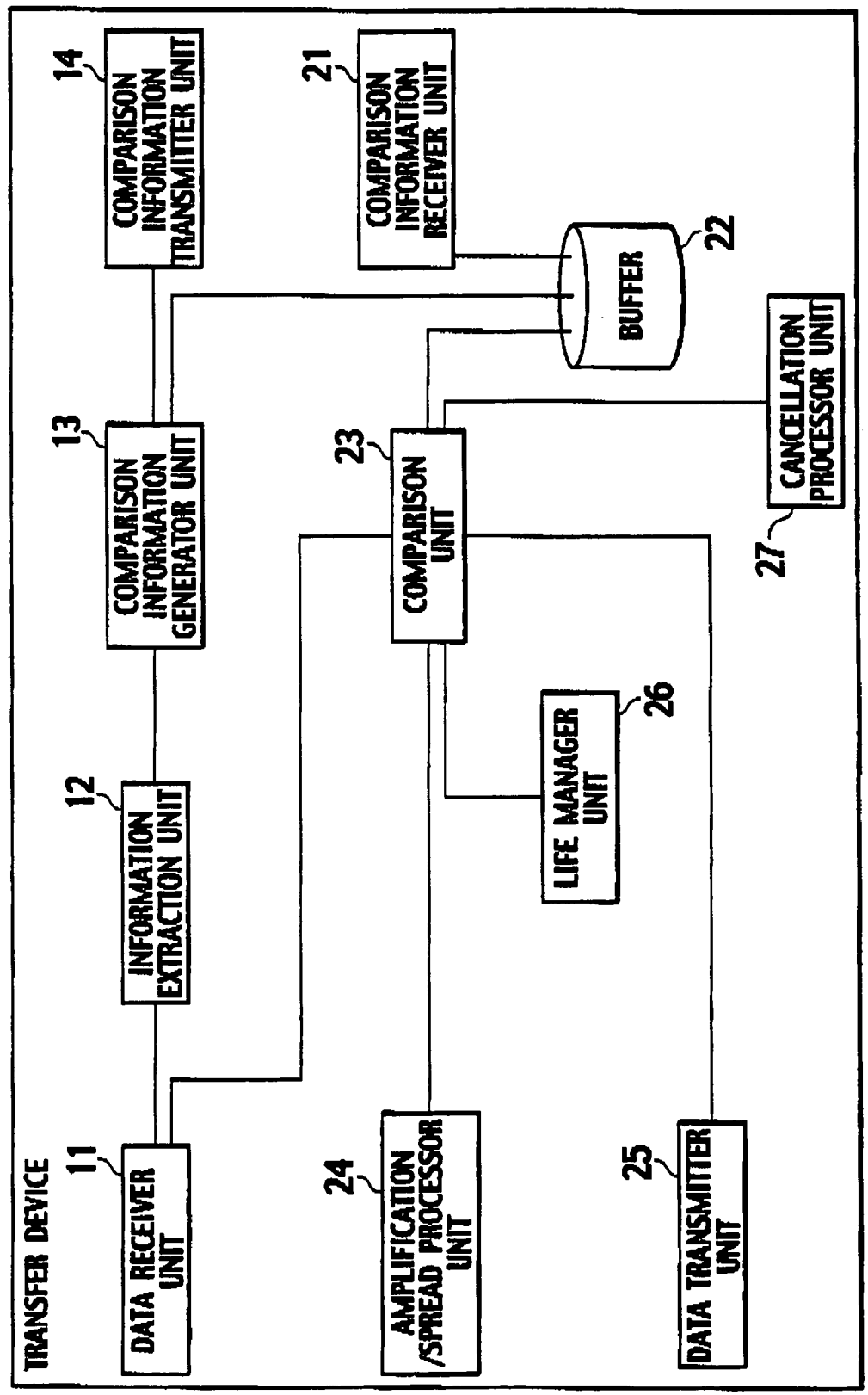
FIG. 2 is a functional block diagram of a transfer device of the communications system according to the first embodiment of the present invention.

With reference to FIGS. 1 and 2, descriptions will be given of a configuration of a data communications system according to a first embodiment of the present invention.

As shown in FIG. 1, in the data communications system according to the present embodiment, a plurality of transfer devices D1 to D3, R1 to R3 and S1 to S3 are connected to a plurality of data communications devices A1 to A3 and V1 to V3 via a data communications network 1.

Here, the data communications devices according to the present embodiment may be mobile communication terminals capable of being connected to transfer devices wirelessly, or may be communication terminals which can be connected to transfer devices by wire.

Hereinafter, descriptions will be given of a typical example of a transfer device according to the present embodiment with reference to FIG. 2.

As shown in FIG. 2, the transfer device according to the present embodiment includes a data receiver unit 11, an information extraction unit 12, a comparison information generator unit 13, a comparison information transmitter unit 14, a comparison information receiver unit 21, a buffer 22, a comparison unit 23, an amplification/spread processor unit 24, a data transmitter unit 25, a life manager unit 26, and a cancellation processor unit 27.

The data receiver unit 11 is configured to receive data transmitted from the data communications devices via the data communications network 1.

The information extraction unit 12 is configured to extract an extraction target from the data received by the data receiver 11. The detailed description will later be given of the operation of extracting the extraction target.

The comparison information generator unit 13 is configured to generate comparison information including the extraction target extracted.

Here, the comparison information may be composed of a part of the data received by the data receiver 11, or may be composed in a manner that a specific word contained in the data received by the data receiver 11, and an appearance order of the specific word are included therein. Detailed descriptions will later be given of the operation of generating the comparison information.

The comparison information transmitter unit 14 is configured to transmit the comparison information generated by the comparison information generator unit 13 to another transfer device. Detailed descriptions will later be given of the operations of transmitting the comparison information.

The comparison information receiver unit 21 is configured to receive the comparison information from another transfer device via the data communications network 1.

The buffer 22 is configured to temporarily accumulate the comparison information received by the comparison information receiver unit 21.

The comparison unit 23 is configured to compare the comparison information received by the comparison information receiver unit 21 (that is, the comparison information accumulated in the buffer 22) with the data received by the data receiver unit 11.

Furthermore, the comparison unit 23 is configured to compare the comparison information received by the comparison information receiver unit 21 (that is, pieces of the comparison information accumulated in the buffer 22) with each other.

Moreover, the comparison unit 23 may be configured to compare the comparison information with the data received by the data receiver 11, when receiving the same type of comparison information the number of which is equal to or more than a threshold value.

In other words, the comparison unit 23 may be configured to compare the comparison information with the data received by the data receiver 11, when the number of the comparison information, which type is same, received by the comparison information receiver unit 21 is equal to or more than a threshold value.

In addition, the comparison unit 23 is configured to select comparison information, which is used for the above comparison, depending upon a place where the information is generated.

For example, the comparison unit 23 is configured to make the relevant comparison by preferentially using the comparison information which is generated by a transfer device close to the relevant transfer device.

The amplification/spread processor unit 24 is configured to increase the number of the relevant comparison information and transfer the relevant comparison information, when the above comparison information are judged to agree with each other as a result of the above comparison made by the comparison unit 23.

Here, the amplification/spread processor unit 24 may be configured to judge that the relevant comparison information agree with each other, when the comparison information agree with each other in equal to or more than a certain part, or may be configured to judge that the relevant comparison information agree with each other when the comparison information agree with each other in all parts.

Note that in the former case, it is highly likely to gain the same effects as a case to be described later, in which comparison information is divided.

Furthermore, the amplification/spread processor unit 24 may be configured to perform a predetermined weight assignment process in terms of the number of the comparison information to be transferred to each transfer destination.

For example, the amplification/spread processor unit 24 may be configured to perform the above weight assignment process based on a topology of a neighboring function, may be configured to perform the above weight assignment process depending upon the number of the comparison information received by the comparison information receiver unit 21, or may be configured to perform the above weight assignment process depending upon the number of the comparison information transferred to the transfer destinations.

For example, the amplification/spread processor unit 24 may be configured to perform the above weight assignment process in a proportional or inversely proportional manner to the number of the comparison information received by the comparison information receiver unit 21, or may be configured to perform the above weight assignment process in a proportional or inversely proportional manner to the number of the comparison information transferred to the transfer destinations.

Additionally, the amplification/spread processor unit 24 may be configured to perform the above weight assignment process based on a square or logarithm of the number of the comparison information which are received by the comparison information receiver unit 21 or which are transferred to the transfer destinations.

Note that detailed descriptions will later be given of the amplification/spread processes.

The data transmitter unit 25 is configured to transfer, to a desired transfer destination, data which have not been deleted by the life manager unit 26 and the cancellation processor unit 27, among the data received by the data receiver unit 11.

The life manager unit 26 is configured to delete comparison information in which a certain time has elapsed after it was generated (that is, the comparison information which has been timed out).

The cancellation processor unit 27 is configured to delete the relevant data when the comparison information received by the comparison information receiver unit 21 agrees with the data received by the data receiver unit 11 as a result of the above comparison made by the comparison unit 23.

Moreover, the cancellation processor unit 27 may be configured to increase the number of the relevant comparison information when the comparison information received by the comparison information receiver unit 21 agrees with the data received by the data receiver unit 11 as a result of the above comparison made by the comparison unit 23.

Note that detailed descriptions will later be given of the cancellation process.

(Operations of Data Communications System According to the First Embodiment of Present Invention)

With reference to FIGS. 3 to 7, descriptions will be given of operations of the data communications system according to the present embodiment.

Figure 3:
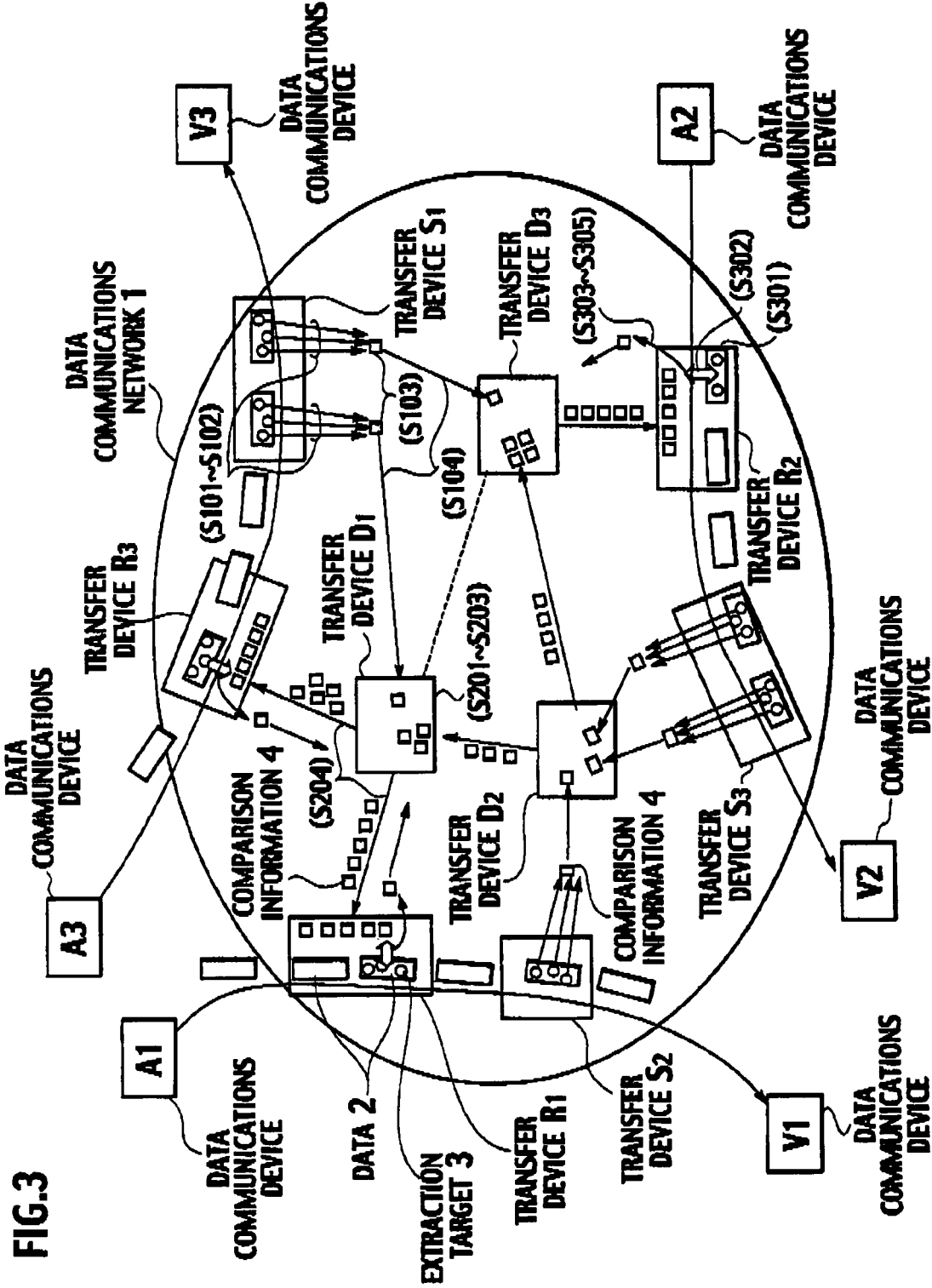
FIG. 3 is a view for explaining a whole operation in the communications system according to the first embodiment of the present invention.

As shown in FIG. 3, in this embodiment, data transmitted by the data communications device A1 is transferred to the data communications device V1 through the transfer devices R1 and S2, data transmitted by the data communications device A2 is transferred to the data communications device V2 through the transfer devices R2 and S3, and data transmitted by the data communications device A3 is transferred to the data communications device V3 through the transfer devices R3 and S1.

Hereinafter, descriptions will sequentially be given of the process of extracting information and the processes of generating and transmitting comparison information in the transfer device S1, the amplification/spread processes in the transfer device D1, and the cancellation process in the transfer device R2.

Firstly, with reference to FIGS. 3 to 5B, descriptions will be given of the process of extracting information and the processes of generating and transmitting comparison information in the transfer device S1.

As shown in FIGS. 3 and 4, in Step S101, the information extraction unit 12 of the transfer device S1 selects target data targeted for the information extraction process from data (packets) received by the data receiver unit 11. For example, the information extraction unit 12 selects the relevant target data by random sampling.

In Step S102, the information extraction unit 12 extracts an extraction target composing comparison information from the selected target data.

In a first extraction method, the information extraction unit 12 extracts a single keyword such as a URL, an e-mail address, and a phone number from the target data.

The first extraction method is assumed to be mainly used as a countermeasure against a case of an unsolicited e-mail which advertises websites of selling commodity products and an online service.

The feature of the unsolicited e-mail is to indiscriminately notify an unspecified number of users of an equivalent content.

Therefore, the unsolicited e-mails often have similar contents included in each unsolicited e-mail, even if they are sent separately.

Additionally, since the purpose of the unsolicited e-mail is to advertise the above websites and the like, it is not possible to falsify its contact information such as a URL, an e-mail address, and a phone address.

Hence, according to the first extraction method, the information extraction unit 12 is supposed to extract the above contact information and texts as extraction targets included in comparison information which shows the feature of an unsolicited communication, considering the nature of unsolicited e-mails.

Figure 5A:
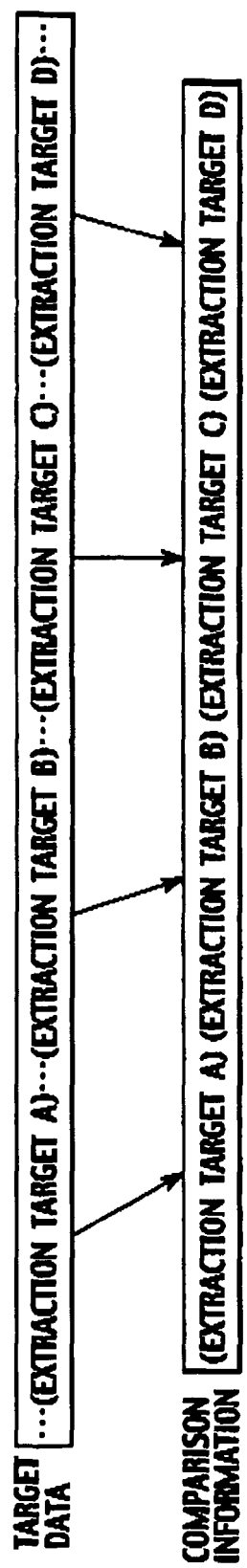
FIGS. 5A and 5B are views for explaining operations of generating and transferring comparison information in the communication system according to the first embodiment of the present invention.

In a second extraction method, as shown in FIG. 5A, the information extraction unit 12 extracts specific words and an appearance order of the specific words while the "specific words (which are not only words having specific meanings, but also may be characters such as Chinese characters and hiragana or a combination of words and characters)" are previously specified.

Note that the information extraction unit 12 is configured to update the specific words as the extraction targets as appropriate.

The second extraction method is assumed to be mainly used as a countermeasure against a case where the body of an e-mail message is camouflaged in order to disturb a conventional type of filter as does a hash buster.

Since, according to the comparison information generated with the extraction target extracted by the second extraction method, a possibility to compare the contents themselves for advertisement with each other is increased without being confused by the above-mentioned camouflaged part.

Therefore, the comparison information thus generated is made possible to be used more efficiently as the comparison information.

The reason why the expression "the possibility is increased" is employed here is that, while a single comparison information is meaningless, the comparison information becomes useful for the control of a suspected communication as a result of increased probability of an interaction with a subsequent communication only when the number of the comparison information is increased in the course of the spread and amplification processes.

Note that the smaller the extraction target is divided into in the second extraction method, the less likely the comparison is confused by the above-mentioned camouflaged part.

In Step S103, the comparison information generator unit 13 generates comparison information based on the extraction target extracted by the information extraction unit 12.

For example, as shown in FIG. 5A, the comparison information generator unit 13 generates comparison information composed of extraction targets A to D extracted from target data.

The comparison information is composed in a manner that it includes specific words contained in received data (target data) and the appearance order of the specific words contained therein. In addition, the comparison information is composed of a part of the received data (the target data).

Figure 5B:
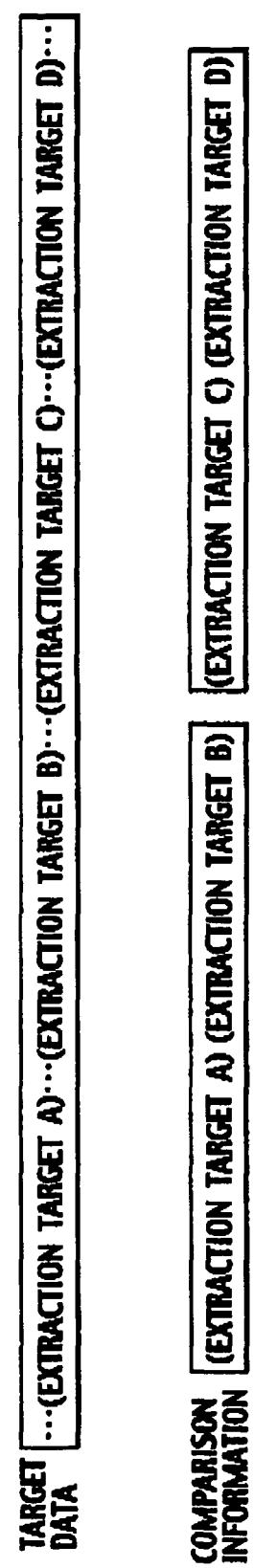

Additionally, as shown in FIG. 5B, the comparison information generator unit 13 may generate comparison information by dividing, into some pieces, the extraction targets A to D extracted from the target data.

In the example of FIG. 5B, while generating the comparison information which is composed of the extraction targets A and B extracted from the target data, the comparison information generator unit 13 generates the comparison information composed of the extraction targets C and D extracted from the target data.

In Step S104, the comparison information transmitter unit 14 transfers the comparison information generated by the comparison information generator unit 13 to another transfer device.

Incidentally, the comparison information transmitter unit 14 may be configured to transfer the comparison information to all the neighboring transfer devices, or may be configured to transfer the comparison information to all the transfer devices that satisfy a predetermined condition.

Note that even if the comparison information is in a state where it is not expressed in a readable format since an encoding process is performed thereon, it is possible to use specific words and codes in an extraction target, thus making it possible to perform the above information extraction process and processes of generating and transmitting comparison information without sequentially performing a decoding process.

Moreover, when the data communications system according to the present embodiment is used as a countermeasure against a worm, the above information extraction process and processes of generating and transmitting comparison information are applied to binary data.

Secondly, with reference to FIGS. 3 to 6, descriptions will be given of the amplification and spread processes in the transfer device D1.

As shown in FIGS. 3 and 6, in Step S201, the comparison information receiver unit 21 of the transfer device D1 accumulates, in the buffer 22, the comparison information received via the data communication network for a certain period of time.

Incidentally, the comparison information may be one transmitted into the data communication network 1 by the above processes of generating and transmitting comparison information, and may be one arbitrarily put into the data communications network 1 from outside.

In Step S202, the comparison unit 23 of the transfer device D1 compares the comparison information accumulated in the buffer 22 with each other, after a certain lapse of time.

When the comparison information agree with each other, the operation proceeds to Step S203. When the comparison information do not agree with each other, the operation proceeds to Step S204.

In Step S203, the amplification/spread processor unit 24 of the transfer device D1 increases the number of the comparison information to $\beta$ times.

In Step S204, the life manager unit 26 of the transfer device D1 deletes, from the buffer 22, the comparison information which is judged that it is at the end of life (that a certain time has passed, or that it has timed out).

Note that the life manager 26 unit may judge, based on a certain function, whether or not the comparison information comes to the end of its life (for example, the exponential distribution and the like).

In this manner, since a length of life is given to comparison information, there is no risk that the comparison information increases too much, and that overflows within the data communications network 1.

In Step S205, the amplification/spread processor unit 24 transfers the comparison information, which has been increased to $\beta$ times, to another transfer device.

Here, the amplification/spread processor unit 24 may be configured to uniformly transfer the comparison information to all the neighboring transfer devices, or may be configured to perform a predetermined weight assignment process with regard to the number of comparison information transferred to each of the neighboring transfer devices.

For example, the amplification/spread processor unit 24 may be configured to perform the above weight assignment process based on a topology of a neighboring function (a neighboring transfer device), may be configured to perform the above weight assignment process in a proportional or inversely proportional manner to the number of the comparison information received so far, or may be configured to perform the above weight assignment process in a proportional or inversely proportional manner to the number of the comparison information transferred so far.

Thirdly, with reference to FIGS. 3 and 7, descriptions will be given of a cancellation process in the transfer device R2.

As shown in FIGS. 3 and 7, in Step S301, the comparison information receiver unit 21 of the transfer device R2 accumulates comparison information received via the data communications network, in the buffer 22.

In Step S302, the comparison unit 23 of the transfer device R2 compares the comparison information accumulated in the buffer 22 with data received by the data receiver unit 11.

Note that the comparison unit 23 may be configured to make the comparison unconditionally, or may be configured to make the comparison in a case where a predetermined condition is satisfied (for example, in a case where the number of the comparison information in the buffer 22 exceeds a predetermined threshold value).

Furthermore, the comparison unit 23 may be configured to make the comparison by preferentially using comparison information generated by a transfer device which is close to the transfer device R2.

When the comparison information agrees with the data received by the data receiver unit 11, the operation proceeds to Step S303. When the comparison information does not agree with the data received by the data receiver unit 11, the operation proceeds to Step S305.

The cancellation processor unit 27 of the transfer device R2 deletes data which agrees with the comparison information in Step S303, and increases the number of the comparison information to $\gamma$ times in Step S304.

The data deleted here is data similar to data related to an unsolicited communication (for example, an unsolicited e-mail, a worm, or a virus e-mail).

Note that the cancellation processor unit 27 may be configured to accumulate the data or to decrease the transfer rate of the data, instead of deleting the data which agrees with the comparison information, in Step S303.

Here, an originating address or a protocol type of the data or the like may be used, as a judgment criterion on whether the data is deleted, the transfer rate of the data is decreased, or the data is accumulated.

In Step S305, the cancellation processor unit 27 transfers the comparison information increased to $\gamma$ times to another transfer device.

Here, the cancellation processor unit 27 may be configured to transfer the comparison information uniformly to all the neighboring transfer devices, or may be configured to perform a predetermined weight assignment process on the number of comparison information which are transferred to each of the neighboring transfer devices.

For example, the cancellation processor unit 27 may be configured to perform the above weight assignment process based on a topology of a neighboring function (a neighboring transfer device), may be configured to perform the above weight assignment process in a proportional or inversely proportional manner to the number of the comparison information received so far, or may be configured to perform the above weight assignment process in a proportional or inversely proportional manner to the number of the comparison information transferred so far.

Incidentally, if a part of packets are lost in a handshaking-type communication such as TCP, an operation of retransmission is performed since a data communication device on a transmission side is timed out.

According to the cancellation process, a situation equivalent to a state where a part of packets are lost during transmission is produced, thus making it possible to dramatically decrease a transfer speed of a data communication device which generates a large number of similar suspected communications (including ones whose data amount dispersedly generated from each data communication device is little, but their total amount is large).

In reality, in order to generate comparison information in time, it is possible to adjust parameters such as $\beta$ and $\gamma$, or perform the weight assignment process regarding a distribution condition on the comparison information in a spread process, in advance.

Accordingly, individual TCP sessions are to be pending in the data communications device on the transmission side, while keeping a state of retransmission, until resources for TCP transmission reaches to the limit.

As a result, once interaction between comparison information and each communication starts (that is, a part of packets is deleted), most of subsequent communications are not made.

On the other hand, in a specific communication, when comparison information is hardly generated, filtering control is highly unlikely performed with the comparison information generated by use of the communication. In this case, the communication is hardly affected, which is an advantage.

Note that, even in this case, the comparison information of an amount which is approximately equal to an amount to be produced by a multiplication of a random sampling rate and an average life of the comparison information, exists. No cancellation process is performed when the comparison information is compared with unsimilar data upon spread process. Therefore, the increased number of comparison information does not affect the communication at all.

Moreover, when data added to the data communications network 1 by the above amplification/spread process is similar to each other (when becoming a suspected communication), comparison information generated due to the process of generating and transmitting comparison information expands the area where the comparison information exist, and increases the number of the existing comparison information in the data communications network 1.

Consequently, since the cancellation process is promoted at points where the number of suspected communications are estimated to be generated, that is, at points where the concentration (quantity) of comparison information is increased, it is possible to expect to find autonomously an optimum point where the filtering control should be performed.

In addition, it is conceivable, instead of performing the above cancellation process as shown in the above embodiment, to perform some marking on subsequent communications (subsequent data) proportionally to the number of comparison information, or to add supplemental information to comparison information, when there exist a number of comparison information.

In this case, each transfer device may perform the above cancellation process according to the marking or the supplemental information, or may decrease the amount of data to be viewed in order to cause a data communications device on a receiving side to grasp the degree of suspicion of the data together, although the data are allowed to reach the data communications device on the receiving side.

Furthermore, a data communications device on a receiving side and a data communications network provider may inject comparison information.

In this case, it is possible to avoid an unsolicited communication in advance, by injecting the comparison information showing a feature of an unsolicited communication known to a data communications device on a receiving side or to a data communications network provider.

Moreover, in this case, a necessity to delete other comparison information which agrees with the one injected is marked for the comparison information to be injected.

Moreover, according to the present embodiment, when a number of data including information which is similar to each other are being generated, it is possible to control the amount of communications and the like.

For example, when the target of extracting information is extended to an attached document in addition to the main body of e-mail, it is possible to expect more effects of the filtering control on a virus e-mail.

When the target is limited to the header information, it is made possible to effectively control DDoS and communications causing congestion.

Note that although, in the above embodiment, the number of the comparison information is increased or decreased by the amplification/spread process, the cancellation process and the like, the present invention is not limited to the case.

The present invention is applicable in cases where a field to show "the number of the comparison information" is added in the comparison information, and then "the number of the comparison information" in the field is increased or decreased by the amplification/spread process, the cancellation process and the like.

In these cases, it is possible to logically increase and decrease the number of the comparison information by the amplification/spread process, the cancellation process and the like, without physically increasing or decreasing the number of the comparison information.

(Effects of Data Communications System According to the First Embodiment of the Present Invention)

In the data communications system according to the present embodiment, the cancellation processor unit 27 is capable of, in real time, processing data which agree with comparison information received from the data communications network 1, by judging that the data is related to an unsolicited communication and by autonomously deleting the data, even when the suspected communication appears for the first time, without prior knowledge or information thereof.

Moreover, in the data communications system according to the present embodiment, the amplification/spread processor unit 24 increases the number of the comparison information and transfers them when predetermined conditions are satisfied.

Then, the comparison information showing a feature of an unsolicited communication is distributed in the whole data communications network 1.

Hence, it is possible to perform a process on the type of suspected communication produced by data, though each of them being small amount, generated dispersedly from a wide area.

Additionally, in the data communications system according to the present embodiment, the cancellation processor unit 27 deletes data related to an unsolicited communication autonomously.

Therefore, there is no need to particularly decide a specific point to perform the filtering control on an unsolicited communication.

Furthermore, in the data communications system according to the present embodiment, the deletion of data related to an unsolicited communication by the cancellation processor unit 27, and the increase and transfer of the comparison information showing the feature of the unsolicited communication by the amplification/spread processor unit 24 are performed in the whole data communications network 1.

Therefore, it is possible to prevent a decrease in judgment precision of the unsolicited communication attributed to observation and control on a specific communication.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A data communications system which communicates data via a data communications network, comprising:
   an information extraction unit configured to extract an extraction target from a random sample of received data;
   a comparison information generator/transmitter unit configured to generate and transmit comparison information including the extraction target extracted by the information extraction unit;
   a comparison unit configured to compare, the comparison information and detect a same comparison information, the comparison unit comparing the same comparison information with the received data, when a number of the same comparison information is greater than a predetermined threshold; and
   a cancellation processor unit configured to delete the received data, when the received comparison information agrees with the received data,
   wherein the comparison unit is further configured to compare the received comparison information with each other;
   the data communications system further comprises an amplification/spread processor unit configured to increase the number of the comparison information and to transfer the comparison information, when the received comparison information agree with each other; and
   the amplification/spread processor unit is configured to perform a predetermined weight assignment process regarding the number of the comparison information to be transferred to each transfer destination, and the weight assignment process is based on a topology of a neighboring function.

2. A data communications system which communicates data via a data communications network, comprising:
   an information extraction unit configured to extract an extraction target from a random sample of received data;
   a comparison information generator/transmitter unit configured to generate and transmit comparison information including the extraction target extracted by the information extraction unit;
   a comparison unit configured to, the comparison information and detect a same comparison information, the comparison unit comparing the same comparison information with the received data, when a number of the same comparison information is greater than a predetermined threshold; and
   a cancellation processor unit configured to delete the received data, when the received comparison information agrees with the received data,
   wherein the comparison unit is further configured to compare the received comparison information with each other;
   the data communication system further comprises an amplification/spread processor unit configured to increase the number of the comparison information and to transfer the comparison information, when the received comparison information agree with each other; and
   the amplification/spread processor unit is configured to perform a predetermined weight assignment process regarding the number of the comparison information to be transferred to each transfer destination, and the weight assignment process depends upon the number of the transferred comparison information.

* * * * *